United States Patent [19]
Chamoulaud

[11] Patent Number: 5,401,281
[45] Date of Patent: Mar. 28, 1995

[54] PROCESS AND INSTALLATION FOR THE INDUSTRIAL PRODUCTION OF PLANTS IN SOIL-FREE CULTIVATION

[76] Inventor: Michel Chamoulaud, 46 Rue Louis Coullet, 33700 Merignac, France

[21] Appl. No.: 941,952

[22] Filed: Sep. 8, 1992

[30] Foreign Application Priority Data

Sep. 9, 1991 [FR] France ............................ 91 11122

[51] Int. Cl.⁶ .............................................. A01G 9/02
[52] U.S. Cl. ................................. 47/1.01; 47/66; 47/56
[58] Field of Search .................... 47/1.01, 66 B, 56

[56] References Cited

U.S. PATENT DOCUMENTS

| | | | |
|---|---|---|---|
| 3,362,106 | 1/1968 | Goldring | 47/56 |
| 3,733,745 | 5/1973 | Ingerstedt et al. | 47/56 |
| 3,872,621 | 3/1975 | Greenbaum | 47/56 |
| 4,291,499 | 9/1981 | Prewer | 47/56 |
| 4,369,599 | 1/1983 | Franclet et al. | 47/66 B |
| 5,081,791 | 1/1992 | Baron et al. | 47/66 B |

FOREIGN PATENT DOCUMENTS

| | | | |
|---|---|---|---|
| 1304693 | 8/1962 | France | |
| 2172040 | 9/1973 | France | |
| 2372589 | 6/1978 | France | |
| 2402594 | 4/1979 | France | |
| 2723435 | 12/1977 | Germany | 47/66 B |
| 496915 | 8/1954 | Italy | 47/56 |
| 0049428 | 4/1980 | Japan | 47/66 B |
| 0119828 | 9/1980 | Japan | 47/66 B |
| 93/008681 | 5/1993 | WIPO | 47/66 B |

Primary Examiner—Ramon S. Britts
Assistant Examiner—Joanne C. Downs
Attorney, Agent, or Firm—Bacon & Thomas

[57] ABSTRACT

The process which is suited to a mechanized implementation substantially comprises the following stages:

1) forming in a continuous manner on the soil a sleeve enclosing a culture substratum comprising graded particles by laying in a continuous manner on the soil in succession at least a first plastics film sealing tight at the roots, a layer of the culture substratum with a predetermined thickness and a width smaller than that of the first film, and at least one second film with a width greater than that of the culture substratum layer, and ensuring in a continuous manner as the sleeve is formed, fastness, by adhesion or welding, of the longitudinal edges of the first and second films.

2) laying on the sleeve seeding comprising seed grains or cuttings and an additional culture substratum heavily moistened comprising a semi-liquid mud.

After the plants have grown, the culture sleeve can be gathered up mechanically in sections or rolls then divided into small units.

16 Claims, 6 Drawing Sheets

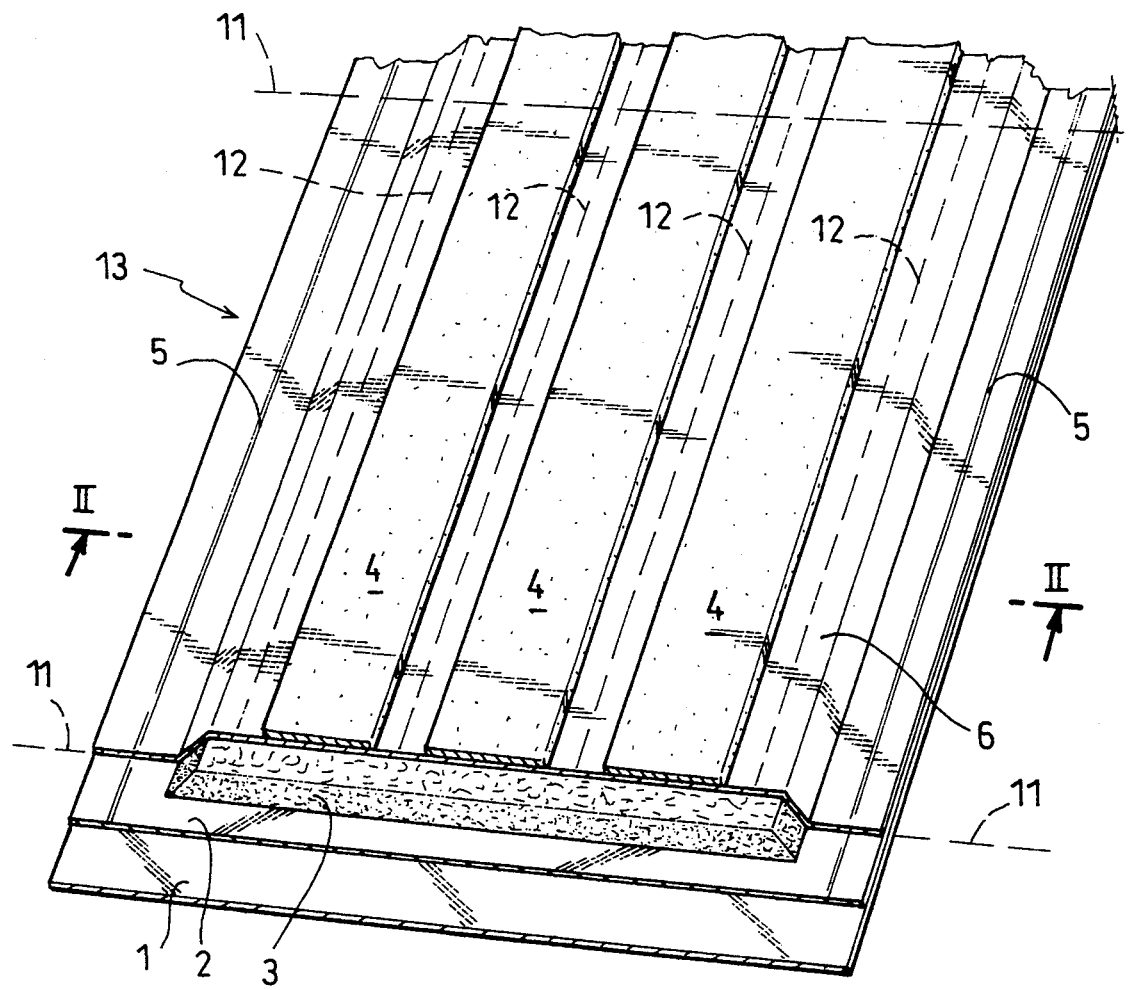
Fig_1
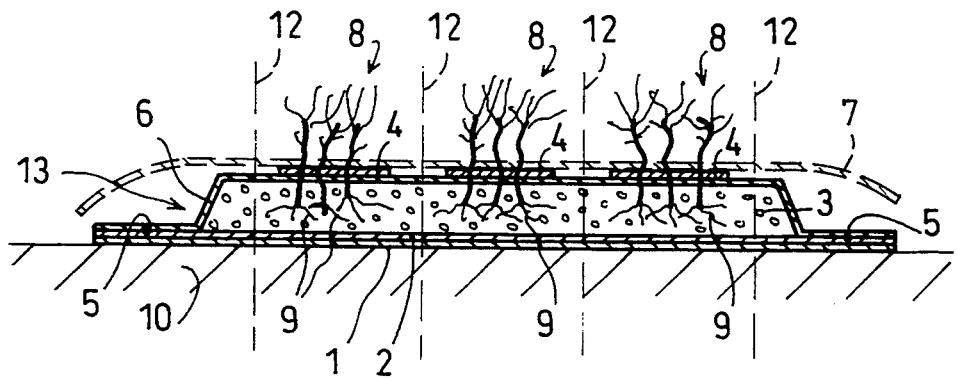
Fig_2

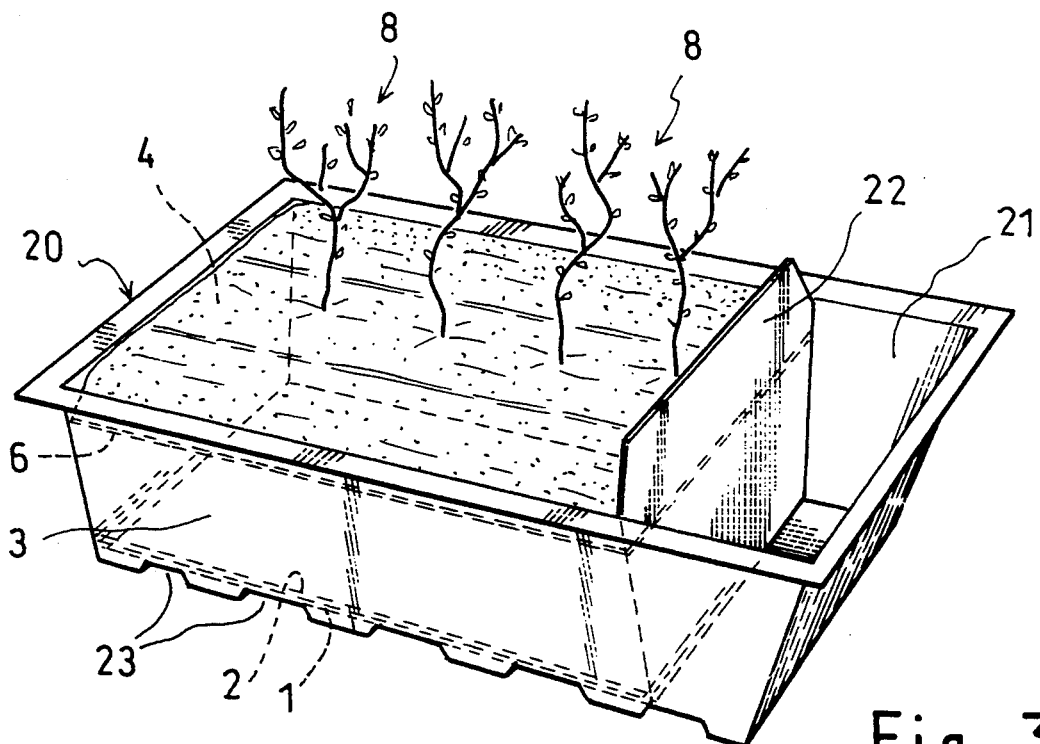
Fig_3
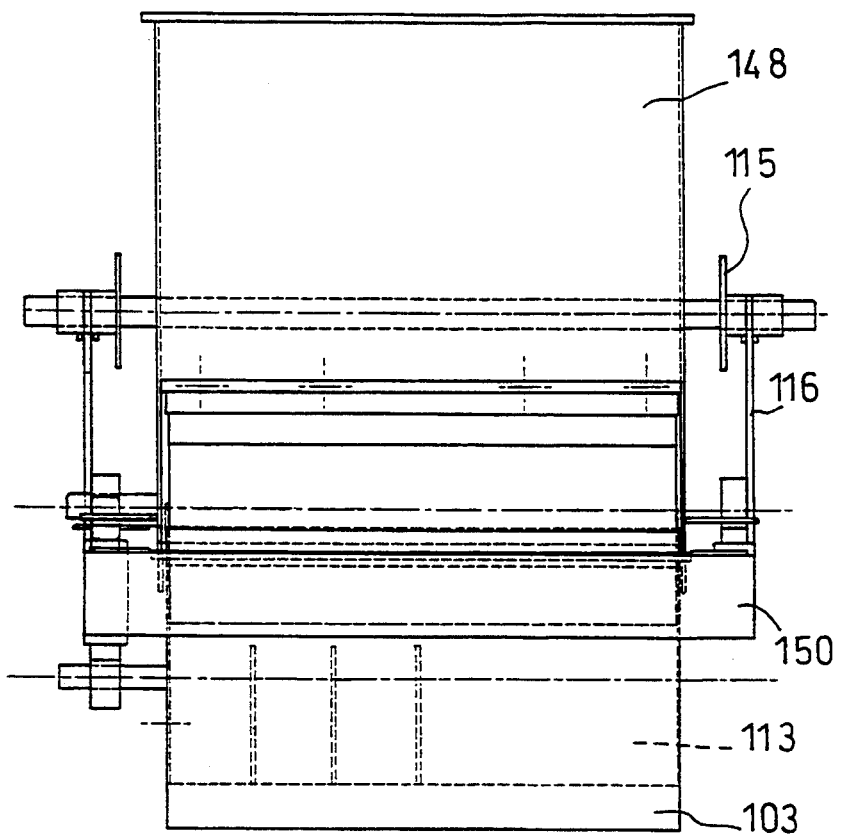
Fig_8

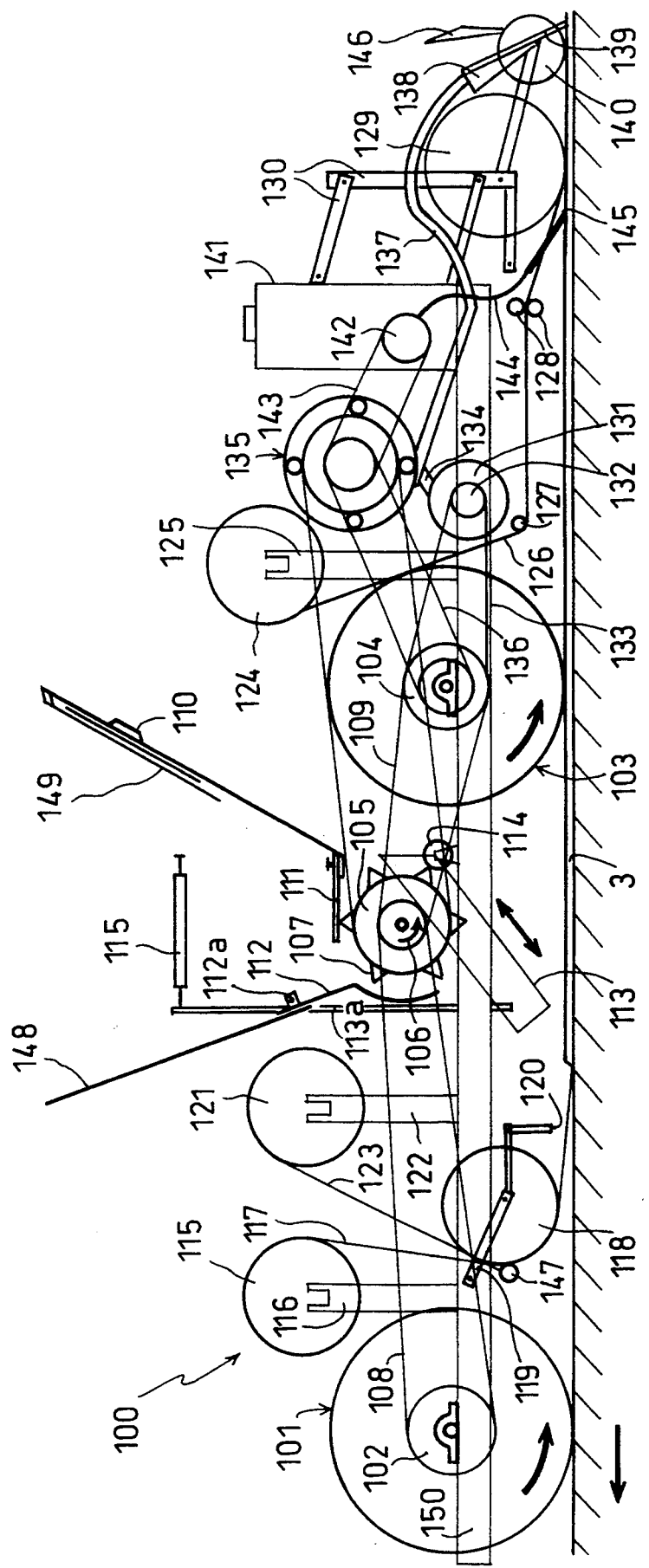
Fig_4

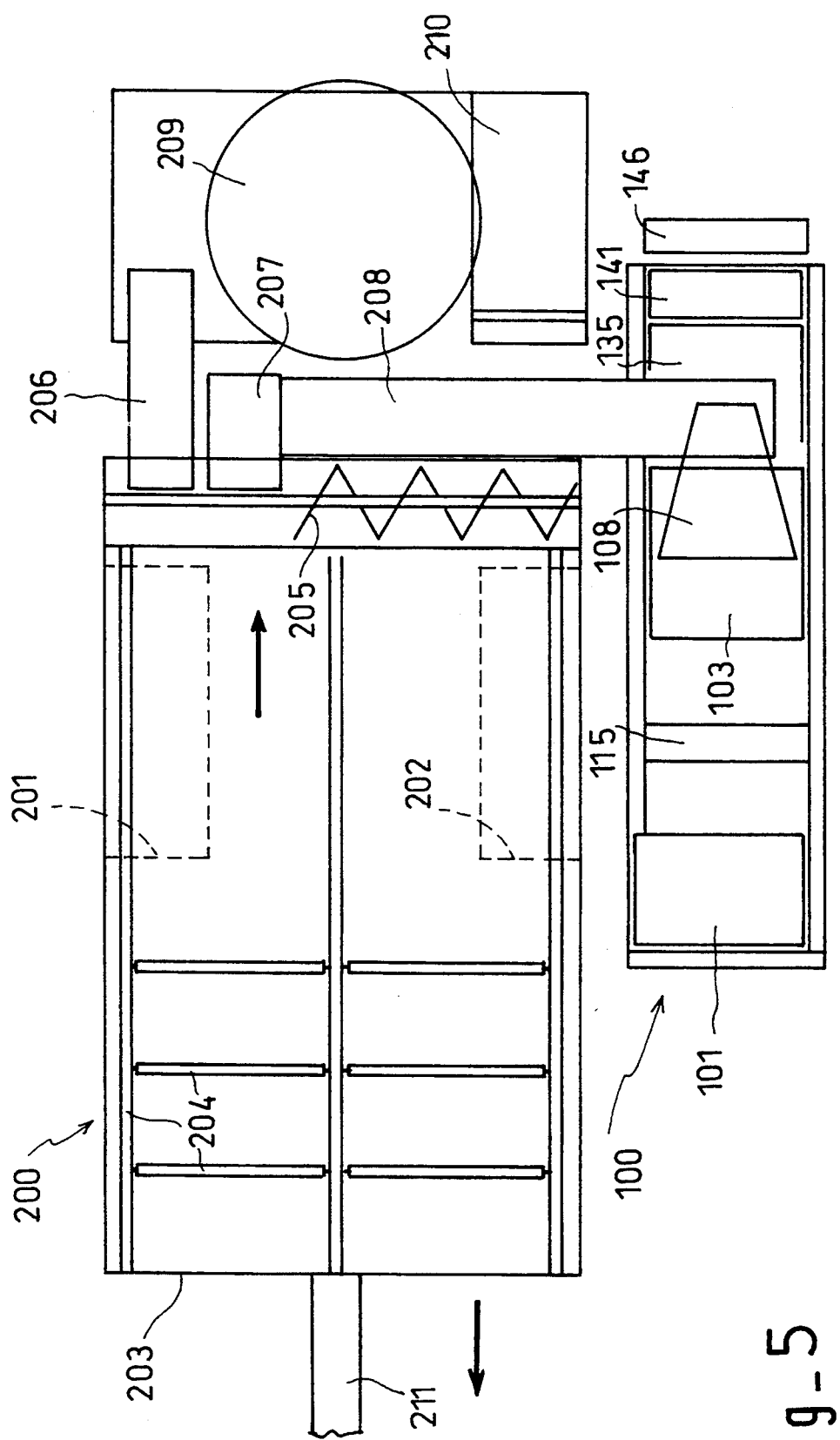
Fig_5

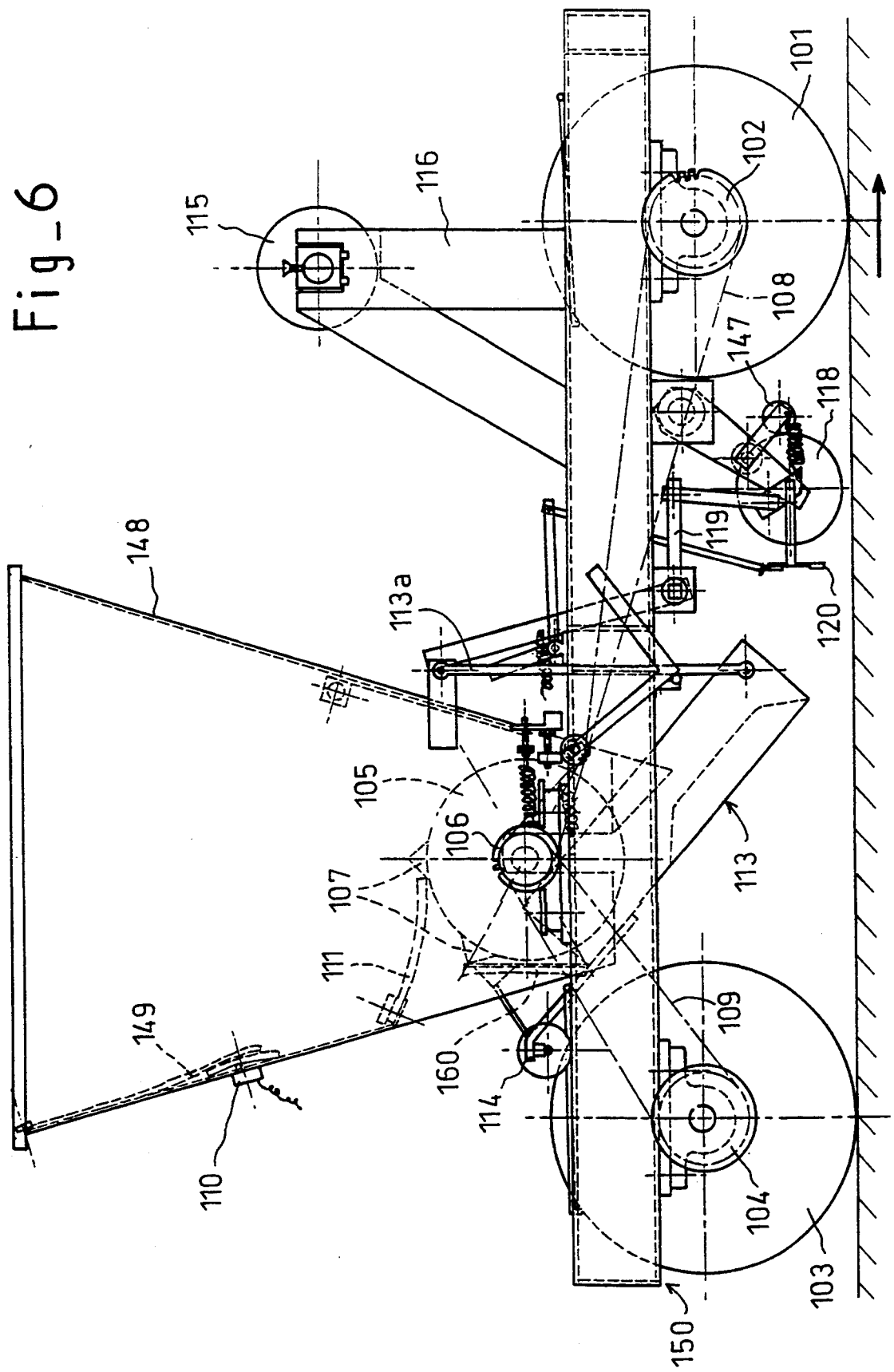

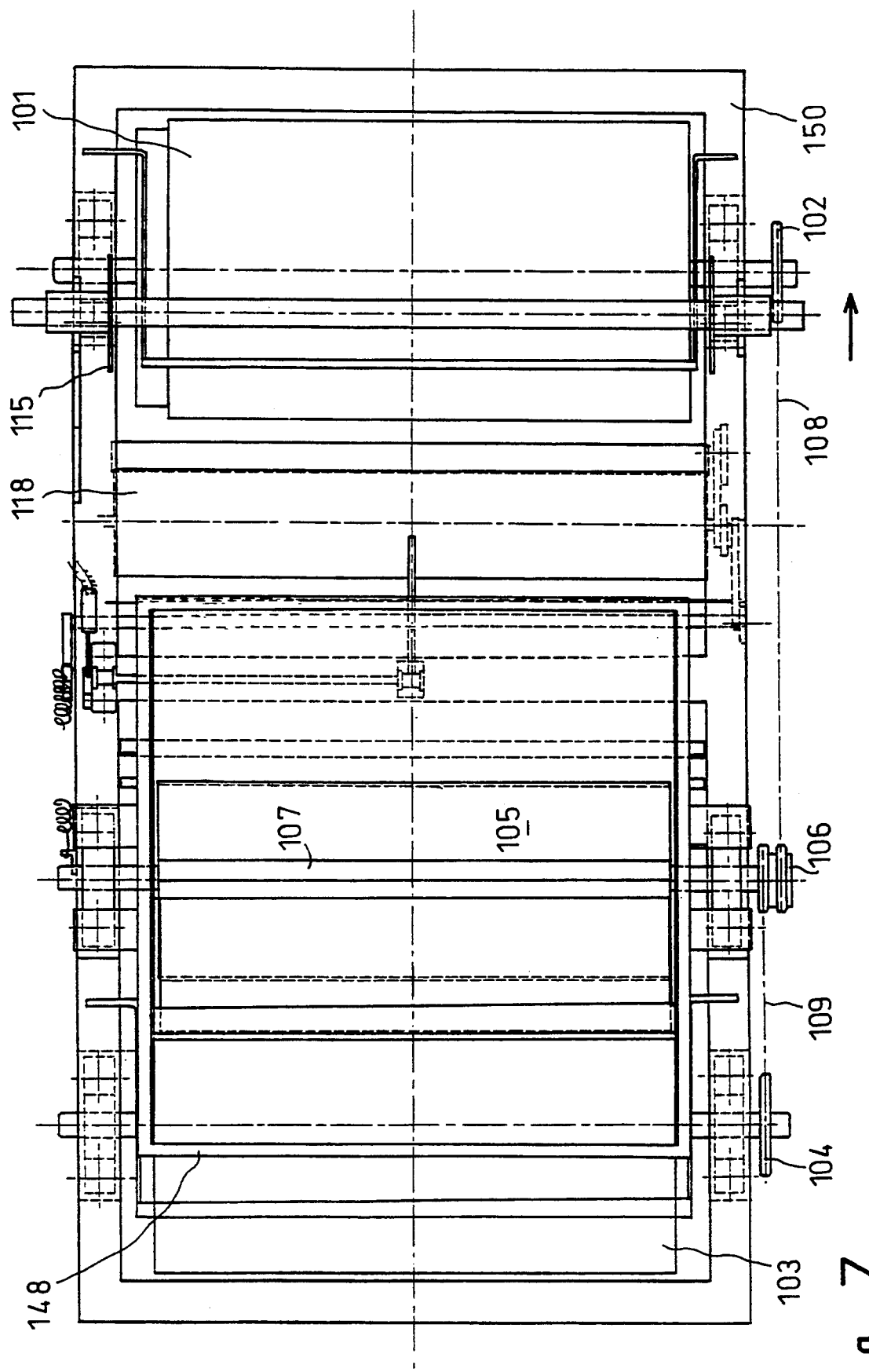

PROCESS AND INSTALLATION FOR THE INDUSTRIAL PRODUCTION OF PLANTS IN SOIL-FREE CULTIVATION

FIELD OF THE INVENTION

The subject of the present invention is a process and installation for the industrial production of plants in soil-free cultivation, and relates more particularly to the cultivation of aromatic plants or vegetable plants which have a scarcely branched root system and plants which have to be cultivated in such a way as to be spaced apart, such as flowers.

BACKGROUND OF THE INVENTION

Soil-free cultivation processes for plants are already known using bags in which a chosen substratum is enclosed which can be enriched by nutrient solutions. Soil-free cultivation enables improved control of plant growth and quality, and simplifies handling and packing. Traditional soil-free cultivation in prefabricated bags entails substantial production costs.

It has further already been proposed in patent document FR-A-2 372 589 to produce industrially grass carpets which are produced out of the soil on plastics films which are sealing tight at the roots and which can then be removed from the plastics films, the roots of the grass themselves forming, with the substratum, a natural tissue which ensures the mechanical behavior of the grass carpet.

Plants with scarcely branched root systems such as aromatic plants or plants which have to be cultivated so as to be spaced apart and marketed young such as flowers or tomato plants for instance, do not provide, as does lawn, a carpet sufficiently solid to be handled with ease. Further, producing customized plants does not allow a full mixture containing compost and seeds to be spread directly. The process for cultivating grass in the form of carpets cannot therefore be directly applied to soil-free cultivation of various plants likely to be marketed.

SUMMARY OF THE INVENTION

The present invention aims to remedy the aforementioned disadvantages and enable soil-free cultivation of plants or flowers which have to be picked and marketed while they are still to some degree fragile due to their nature or their still young stage of growth.

The present invention aims more particularly to provide soil-free cultivation according to a process which can easily be implemented in a mechanized manner so as to reduce production costs, whilst ensuring a good degree of preservation and integrity of the plants which have to be picked and packed for large scale marketing.

Said aims are achieved thanks to an industrial process for producing plants in soil-free cultivation, wherein it comprises the following stages:

1) forming in a continuous manner on the soil a sleeve enclosing a culture substratum comprising graded particles by laying in a continuous manner on the soil in succession at least a first plastics film sealing tight at the roots, a layer of said culture substratum with a predetermined thickness and a width smaller than that of the first film, and at least one second film with a width greater than that of the culture substratum layer, and ensuring in a continuous manner as the sleeve is formed, fastness, by adhesion or welding, of the longitudinal edges of the first and second films.

2) depositing on the sleeve seeding comprising seeds or cuttings and an additional culture substratum heavily moistened comprising a semi-liquid mud.

3) rearing the plants by watering and optionally with nutritional supplies.

4) gathering in sections or in rolls the cultivation sleeve after the plants have grown, and 5) cutting, handling and packing the sections of cultivation sleeve containing the plants.

More particularly, according to one preferred embodiment, when the sleeve is being formed, before a culture substratum is deposited, a third film in nonwoven with fine meshing permeable at the roots whose width is greater than that of the culture substratum layer is deposited on the first plastics film which is sealing tight at the roots, and as the sleeve is formed the fastness is ensured in a continuous manner by sticking or welding the longitudinal edges of the second and third films.

In this case, the second film is made of nonwoven material with fine meshing permeable at the roots and likewise comprises with the third film in nonwoven a sleeve inside which the culture substratum particles are trapped, but through which the plant roots can pass.

The heavily moistened additional culture substratum can be laid in a continuous manner. The additional culture substrate constitutes a propicious environment for germination. It can be dispensed with during cultivation or harvesting.

According to a first possible embodiment, the seed grains or cuttings are premixed with the additional culture substratum before the latter is spread.

According to another possible embodiment, the seed grains or cuttings are deposited on the sleeve so as to be separate from the additional culture substratum before or after spreading the latter.

Advantageously, the first film is a plastics water permeable film such as a microperforated film.

For particular applications, such as cultivating tomato plants, it is possible to produce a continuous sleeve with two plastics films. In this case, the first film is a plastics film in which orifices or slots are formed before the seeding is deposited.

The main culture substratum can advantageously be comprised of graded particles of at least one of the following materials: ground bark, peat, vermiculite, wood shavings, humus earth, rock wool.

Preferably, the additional culture substratum is comprised of a finely ground clod peat moistened before spreading.

The culture substratum layer has an average thickness of approximately 15 mm to 50 mm.

The additional cultural substratum spread in the semi-liquid state has an average thickness of 2 mm to 5 mm.

The process according to the invention can comprise the simultaneous formation of several parallel strips of the additional culture substratum layer set at a distance from one another on a single sleeve.

In this case, for instance, the width of a culture substratum layer is approximately 0.50 m to 1.0 m whereas the width of an additional culture substratum layer is approximately 6 cm to 10 cm.

According to another particular feature, during the gathering stage, the first plastics film is left in place whereas the sleeve comprising the second and third films in nonwoven enclosing the culture substratum layer which the plant roots have penetrated is gathered up in sections or rolls.

The process according to the invention can be applied to the cultivation of various sown or cut plants, notably a large variety of sown flowers such as for example pansies, carnations, Indian roses, and aromatic plants such as parsley, chervil or chives for instance.

The invention also relates to sown or cut plants packed in a tray and produced according to the aforesaid process and comprising a main culture substratum layer comprising graded particles enclosed between lower and upper nonwoven films with fine meshing in which the plant roots are entangled.

All operations comprising the process according to the invention can be implemented mechanically, thereby achieving substantially lower production costs per square metre than in the case of traditional methods or in the case of soil-free cultivation in prefabricated sacks.

The invention thus also relates to an installation for implementing the process according to the above-defined invention, wherein it comprises a mobile machine comprising a chassis mounted on first and second parallel transport rollers which bear on the soil and have the same diameter, a first supporting means of one roller for the first film, placed in the vicinity of the first transport bearing roller, a second support means of a roll of a second film, placed in the vicinity of the second transport bearing roller, a feed hopper arranged between the first and second transport bearing rollers to feed the main culture substratum, means synchronized with the forward movement of the first and second transport bearing rollers for evenly spreading the main culture substratum contained in the feed hopper, first and second stamping rollers which can be placed in contact with the soil respectively behind the first and second transport bearing rollers, for applying to the surface the said first and second films, a sealing device arranged in the vicinity of the second stamping roller to make fast the longitudinal edges of the first and second film applied to the soil, and a sowing device arranged in the vicinity of the second stamping roll for depositing on the soil therebehind simultaneously seed grains of cuttings and a semi-liquid additional culture substratum.

The installation further comprises a third support means of a roll of a third film, placed in the vicinity of said first support means of a roll to enable the continuous application to the soil of a third film arranged on the first film.

According to one preferred embodiment, the main culture substratum spreading means comprise, a drum engaged in a synchronous manner with the first transport bearing roller, placed so as to be parallel to the bearing rollers below the feed hopper and provided with angle irons for applying, in cooperation with a lower plate positionally adjustable with regard to the feed hopper, a predetermined feed rate for the main culture substratum depending on the forward speed defined by the supporting rolls in an inclined spreading plate located beneath the drum and provided with a reciprocating movement.

Spreading means comprise in addition a flexible scraper bearing on the angle irons of the drum in its lower part to ensure at once sealing tightness of the hopper, cleaning of the angle irons and elimination of arching effects in the hopper.

According to another feature of one particular embodiment, the sowing device comprises a reservoir and a seed grain or cutting application device and a semi-liquid culture substratum feed device comprising a peristaltic pump associated with the advancement speed of the first and second transport bearing rollers for applying an even quantity of additional semi-liquid substratum to a detent box placed behind the second stamping roll and comprising an outlet orifice cooperating with a flexible blade.

Preferably, the second stamping roll and at least part of the sowing device are mounted on an articulated frame enabling selective contact of the second stamping roll with the soil.

For instance, the sealing device comprises a reservoir for the adhesive, a pump and tubes for applying strands of adhesive to at least one of the films deposited in a continuous manner on the soil, and small additional lateral stamping rolls for applying the films one on top of another at the level of the strands of adhesive.

In order to ensure full mechanization of the soil-free cultivation process on a large scale, the installation can further comprise a device with a heating element for transversally cutting the deposited film at the end of travel of the machine.

Advantageously, the first transport bearing roller which forms an impression in the soil is slightly wider than the second which ensures compacting of the main culture substratum before closing the sleeve enclosing said substratum.

According to a particularly advantageous embodiment, which enables implementation of a special small mobile spreading machine, the installation comprises a trailer driven simultaneously with said mobile machine so as to contain a main compartment for storing the main culture substratum, a main storage reservoir for the additional culture substratum in the semi-liquid state, a fertilizer reservoir and selective feed means of the hopper of said mobile main culture substratum machine controlled according to a filling detection device of the feed hopper.

Other features and advantages of the invention will become apparent from the following description of particular embodiments, given by way of non-limitative examples, with reference to the attached drawings, in which:

FIG. 1 is a diagrammatic perspective view with cutaway showing an example of the sleeve formed in a continuous manner for soil-free cultivation of plants according to the invention, FIG. 2 is a section view along plane II—II of FIG. 1, FIG. 3 is a diagrammatic perspective view of an example of the product packed in a tray and obtained from a soil-free cultivation process according to the invention, FIG. 4 is the skeleton functional diagram, in elevation, of an example of a mobile spreading machine enabling mechanized implementation of the soil-free cultivation process according to the invention.

FIG. 5 is a diagrammatic view in principle, from underneath, illustrating the association of a mobile spreading machine such as the one in FIG. 4 with a suitable storage trailer, and FIGS. 6, 7 and 8 are respectively elevation, plan and rear views of a particular example of the mobile spreading machine provided with its main elements and substantially operating according to the principle of the functional diagram of FIG. 4.

The large-scale soil-free plant cultivation process according to the invention will firstly be explained with reference to FIGS. 1 and 2, according to an embodiment which implements three flexible material films and two different types of culture substratum.

Said process is particularly suited to cultivating seed plants or cuttings which have a scarcely ramified root system, such as aromatic plants (e.g., parsley, chervil, chives) or plants which have to be spaced apart and picked for packing and marketing young, such as flowers (e.g., carnations, pansies, Indian roses).

In point of fact, the process according to the invention enables the setting up in fields of soil-free cultivation means for such plants in a mechanized manner, for building a carpet sufficiently strong to then be able to harvest mechanically, divided up into small units and packed for marketing with the initial culture substratum to guarantee continued growth of the plants after packing.

The process acording to the invention further ensures, thanks to two types of substratum, great adaptability to the germination conditions of different plants, thereby guaranteeing a high sowing success rate.

The soil-free cultivation process as illustrated in FIGS. 1 and 2 consists in setting up in a continuous manner on a soil whose quality is of little importance, but which must however be more or less leveled and free of large stones, a first plastics film 1 sealing tight at the roots, but preferably water permeable. Such a plastics film 1 can be a film provided with microperforations and is advantageously opaque.

An additional film 2 made is then deposited made of a nonwoven material with fine meshing, such as for example a PP17 g/m² type film sold under the registered trademark "Covertan-Pro" by the German company COROVIN GmbH, and comprised of continuous polypropylene filaments stabilized in ultraviolet light and assembled by thermal welding. Such films are usually used simply as sheeting or as covers to protect plantations from climatic risks and create a greenhouse effect for semi-forcing the plants and improve the precocity of harvests. Sheeting of this type in nonwoven material placed loosely over the cultures allows air, water and light to pass through in sufficient quantities for plant growth, but is traditionally neither covered with substratum nor passed through by the plants.

The additional film 2 in nonwoven which is put in place according to the invention, immediately above the first plastics film 1 and can be deposited at the same time as the latter, is intended to be passed through by the plant roots to constitute a lower reinforcement of natural tissue formed by said roots, whilst trapping a main culture substratum 3 comprising graded particles, which is deposited in a continuous manner on the nonwoven film 2 as the latter is put in place.

The main culture substratum 3 can contain different substances comprising a varying proportion of nutrients, but must comprise particles graded in such a way as to enable even spreading forming a carpet of more or less consistent thickness. The average particle size depends on the thickness of the substratum carpet, the particle size can increase with the thickness of the carpet. Particles passing through a sieve with 10 mm meshing are usually well-suited. However, care should be taken to ensure that the substratum particles remain sufficiently large so as not to constitute dust which would clog the apertures of nonwoven film 2 or more generally reduce the efficiency of the mechanized spreading of the substratum and lead to too short substratum conservation.

By way of example, the main substratum can comprise one or more of the following substances mixed: ground bark, for example resinous bark, peat, vermiculite, wood shavings, humus earth, rock wool. However, all products having the right physical and chemical properties for adequate water and air retention are suitable.

The average thickness of the main substratum layer 3 can be approximately 15 mm to 50 mm.

Immediately after spreading the main substratum layer 3, and after compacting it with a roller, a second nonwoven film 6, which can be exactly identical to the first nonwoven film 2 with fine meshing is deposited in a continuous manner on the main substratum layer 3. The different films 1, 2 and 6 are wider than the main substratum layer 3, so as to enable, likewise in a continuous manner, immediately after the upper film 6 has been laid, sealing, for instance by gluing, of at least the upper film 6, and the lower nonwoven film 2 or the basic plastics film 1, along two strands 5 located in the vicinity of the longitudinal edges of the films 1, 2, 6, in such a way as to comprise a continuous sleeve 13 enclosing the main substratum 3 and formed in-situ as the substratum is spread. In this sense, the process differs radically from processes for soil-free cultivation in prefabricated sacks, which do not lend themselves to large-scale mechanical farming.

An additional culture substratum in the form of semi-liquid mud is spread on the sleeve 13. Said spreading can also be performed during the very operation for producing the sleeve 13 as the latter is being formed using the same machine of which all movements are synchronized with the speed of motion of the machine.

The semi-liquid additional substratum can be spread so as to form a layer with a thickness of approximately 2 to 5 millimeteres. The additional substratum can be comprised using clod peat or more particularly a mixture of old or new peat. The additional substratum is aimed at promoting the germination of seeds and can therefore be adapted to each plant whereas the main substratum 3 can be common to various cultures. The additional substratum is likewise useful in the case of cuttings to promote regrowth.

It will be seen that seeds are not premixed with the main substratum 3, but are, on the contrary, deposited on the sleeve 13 after formation thereof.

Depending on the types of plants, notably the germination characteristics and seed size, or the type of cuttings, the seeds or cuttings can be deposited on the upper nonwoven film 6, then covered with the additional substratum 4 or on the contrary be deposited on the additional substratum 4 after spreading the latter or even premixed with the additional substratum 4. In all cases, the seeds or cuttings are not premixed with the main substratum 3, which enables inter alia the plant type to be changed rapidly, and limited operations only on the spreading machine to be performed when the variety of seed is changed, and seed wastage is to be prevented.

As with traditional cultures, a nonwoven film 7 can further cover in a conventional manner in the form of sheeting one or more soil-free cultivation sleeves 13 so as to ensure semi-forced growth and protection against bad weather or damage by animals. Sheeting of this type 7 is removed during cultivation.

In the same way, the additional substratum 4 placed on the sleeve 13 can where appropriate be dispensed with during cultivation or harvesting insofar as it has no particular purpose. Plants 8 are therefore available whose roots 9 penetrate the main substratum 3 by being inserted in the lower nonwoven film 2 and upper nonwoven film 6. The sleeve 13 comprises with the lower film 2 and upper film 6 and the roots 9 a tissue sufficiently solid to be handled, even with plants cultivated separately from one another. Further, the main substratum 3 remains trapped inside the sleeve 13, which improves the cleanness of the presentation.

Soil-free cultivation of plants 8 in the sleeves 13, once these are installed, can be carried out for field crop cultures, with watering and the supply of the necessary nutrient solution complements.

After the plants 8 have grown, they can be collected swiftly either mechanically or manually, even in the case of young plants, thanks to the quality of the carpet formed by the sleeve 13.

The sleeves 13 can be collected in sections or rolls, and are then cut up into small units and packed in pots, trays or small tote boxes for marketing, each unit comprising plants 8 and a carpet comprising the main substratum 3 trapped between the nonwoven films 2 and 6. The microperforated plastics film 1 can be left in place during harvesting, for optional reuse, or can also be gathered up with the rest of the sleeve 13.

Advantageously, as shown in FIGS. 1 and 2, several parallel strips of the additional substratum layer 4 can be formed simultaneously on the same sleeve 13, spaced apart from one another, for cultivation of several series of plants, both identical or different in rows, on the same sleeve 13.

For example, a layer of additional culture substratum can have a width of approximately 6 cm to 10 cm whereas a sleeve containing the main culture substratum 3 can have a width of approximately 0.50 m to 1.00 m, e.g., in the order of 0.60 m to 0.70 m.

The density of plants per surface unit of course depends on the types and varieties. For example, the process can be used for cultivating 8 to 15 parsley stems per unit surface of 20×25 cm.

Various fertilizers, manures, delayed-action fertilizers and nutrient supplies can of course be mixed with the main substratum 3 before spreading, according to the needs of the plants.

Likewise, watering operations and subsequent addition of nutrient supplies can be performed according to the rules of soil-free cultivation.

In FIG. 1, broken lines represent the transverse lines 11 which symbolize the cuts made during harvesting to define the plate units, for instance with a length in the order of 1.50 m, easy to handle and stackable one on top of another.

The broken longitudinal lines 12 of FIGS. 1 and 2 represent cuts which can be made in the workshop when packing precultivated products for marketing. The strips of plants contained between two longitudinal lines 12 can of course in turn be divided up to suit the format of the receptacles provided for packing the plants.

FIG. 3 shows an example of plants 8 produced in compliance with the process according to the invention and packed in a small container 20 for marketing.

The container 20 can comprise a main compartment receiving a block of plants in a carpet obtained from a section of production sleeve 13, and an additional compartment 21 separated from the main compartment by a partition 22, for instance to comprise a water reserve.

The bottom of the container 20 can be provided with grooves 23.

FIG. 3 shows a block with a layer 4 of additional substratum, and a lower plastics film 1. However, the layer 4 can easily be dispensed with after plant growth so as to form a block whose upper face is simply defined by an upper film 6 in nonwoven material. Likewise, the main substratum 3 of the block can simply be held at its lower part by the film 2 in nonwoven in which the roots 9 of the plants 8 are engaged, such that the base film 1 may or may not be present in the final product.

The process according to the invention can have different embodiments.

Thus, according to one particular application, for instance for cultivating tomatoes, the sleeve 13 may only contain one lower plastics film 1, and one upper film 6 likewise in plastics or nonwoven material, which are stuck on their longitudinal edges by inserting the layer of main substratum 3 according to a continuous in situ formation process similar to the one already described. In the event, the film 2 in nonwoven material is not present, and the upper film 6 can be slotted or perforated locally before spreading the additional substratum 4 and the seed grains or cuttings. As in the case of the previously described process, films 1 and 6 forming the sleeve have a slightly greater width than the layer of main substratum 3.

Optionally, after depositing, on the sleeve 13, sowing comprising seeds or cuttings and an additional heavily moistened culture substratum 4 comprising a semi-liquid mud, it is still possible to cover the layer 4 using another layer of non-mud substratum comprising for instance graded ground bark mixed with fertilizer products. This can increase the evenness of germination notably in certain varieties of flowers.

With reference to FIG. 4 a mobile spreading machine 100 will now be described adapted to the implementation of the process according to the invention and forming mechanically a sleeve 13 for soil-free field crop cultivation.

The spreading machine 100 according to the invention substantially comprises a main chassis 150 resting on two front 101 and rear 103 bearing rollers which have identical diameters.

The first bearing roller 101 packs the ground before forming the cultivation sleeve 13 and advantageously has a slightly greater width than the second bearing roller 103.

The second bearing roller 103 compacts the main culture substratum layer 3 deposited on the soil by the machine after the lower films 117 and 120 have been put in position.

The spreading machine 100 can be self-propelled or driven by a separate engine. In all cases the rotary movements imparted to the bearing rollers 101 and 103 are used to derive the operating movements for the other different elements of the machine 100 synchronously with the forward speed of the machine, which helps to ensure evenness in forming a cultivation sleeve 13.

A support 116 of a roll 115 of a plastics film 117 comprising the base film 1 in FIGS. 1 and 2, is arranged in the vicinity of the front bearing roller 101.

A support means 122 of a roll 121 of nonwoven material film 123, corresponding to the film 2 in FIGS. 1 and 2 is likewise placed in the vicinity of the support 116 of the roll 115.

A third support means 125 of a roll 124 of film 126 corresponding to the film 6 in FIGS. 1 and 2 is further placed in the vicinity of the rear bearing roller 103.

A stamping roll 118 arranged immediately behind the roll 101 is mounted on an articulated arm 119 in such a way as to be able to be placed selectively in contact with the soil at the start of each passage for forming a sleeve 13 to apply simultaneously to the ground the films 117 and 123 from rolls 115, 121 and superimposed. A track roller can further ensure the tension of the films 117 and/or 123 and their application on the roll 118 when the latter is raised.

A heating element 120 is advantageously arranged behind the stamping roll 118 for transverse cutting of the plastics film 117 and the film 123 at the end of the run.

A second stamping roll 129 mounted on an articulated parallelogram 130 is arranged at the back of the rear bearing roller 103 and can be placed selectively in contact with the soil at the start of each passage to apply the upper film 126 from the roll 124 to the soil, the upper film 126 being guided and stretched by small intermediate rolls 127, 128.

The main spreading device, arranged between the front and rear rolls 101, 103 to form an even layer of main substratum 3 comprises substantially a feed hopper 148 located above a drum 105 parallel to the rolls 101, 103 and provided with angle irons 107 for engaging the substratum 3. The drum 105 in turn surmounts an inclined spreading plate 113 actuated by a reciprocating movement via the spreading drum 105 by means of a small wheel 114 bearing on the chassis 150.

The alternating reciprocating movement of the spreading sheet 113 is designed to facilitate the formation of a substratum layer 3 with reduced and consistent thickness.

The drum 105 ensures in turn, with the angle irons 107, and in cooperation with a plate 112 extending the hopper 148, the even flow rate of the substratum 3 with regard to the forward speed of the machine. Pinions 102, 104, 106 rigid respectively with rolls 101, 103 and the drum 105 and chains 108, 109 engaged with said pinions guarantee the synchronization of the rotation of the rolls 101, 103 and the drum 105.

The position of the plate 112 articulated on the hopper about an axis 112a, is adjustable to enable the substratum flow rate to be controlled.

The position of the inclined spreading plate 113 connected to the hopper 148 by a shaft 113a cooperating with a return spring 115 is also adjustable via said shaft 113a. The plate system actuated by a reciprocating movement is well suited to producing an even carpet for low-speed spreading.

A flexible blade, for instance in rubber, ensures sealing tightness at the base of the hopper 148 to leave only the authorized passage of the substratum 3 between the drum 105 and plate 112. The blade 111 further enables the angles 107 of the drum 105 to be cleaned permanently and, by its vibrations, to prevent the formation of arching inside the hopper 148.

A contactor 110 placed in the upper part of the hopper 148 and cooperating with a plate 149 is used to detect a fall in the level of product in the hopper 148 and the supply thereof from an adjoining main reserve such as that provided in the case of the configuration in FIG. 5.

After the films 117 and 123 have been deposited on the soil, and preferably after a main substratum layer 3 has been formed by the rear roller 103, and before depositing the upper film 126, the machine 100 seals in a continuous manner the longitudinal edges of the films 117, 123 and 126 forming the cultivation sleeve 13.

To this end, a glue application device 145 is arranged on either side of the machine 100 to deposit a strand of glue on the nonwoven material film 123 in the vicinity of each of its longitudinal edges, on either side of the substratum layer 3. The glue is applied to the devices 145 by flow tubes 144 from a reservoir 141 mounted on the machine, by being sucked up by a pump 142, driven via a chain or belt 143 synchronized with the forward movement of the machine.

Small stamping wheels 140 arranged on either side of the machine ensure contact of the films 126, 123, 117 with the strands of glue.

The additional substratum 4 in the semi-liquid state designed to be spread in thin layers on the sleeve 13 after depositing the upper film 126 and positioning by the stamping roll 129 can be contained in a reservoir 131 mounted on the machine 100 which is preferably fed from a reservoir 209 located on a separate trailer (FIG. 5).

The additional substratum 4 kept in the mud state in the reservoir 209 feeds the cylindrical reservoir 131 containing an agitator with arms to prevent the culture substratum from being deposited, then feeds a pump 135, for instance of the peristaltic type placed on the reservoir 131.

The agitator with arms and the pump 135 operate synchronously with the forward speed of the machine 200, thanks to transmission chains 132, 133, 136 providing the link with the roll 103.

The flow rate of the additional germination substratum 4 is thus controlled by the pump 135 according to the forward speed of the machine to guarantee even spreading.

Pipes 137 provide the supply of additional substratum 4 from the pump 135 to metal detent boxes 138 associated with flexible blades 139 ensuring evenness of the flow.

Seeders 146 are arranged in the vicinity of the detent boxes 138. Said seeders are used depending on the case to deposit the seeds or where appropriate the cuttings before or after spreading the germination substratum 4 or mixing said seed grains or cuttings with the additional substratum 4 before it is spread.

An additional compartment containing a reserve of non-mud substratum comprising for instance graded ground bark mixed with fertilizer products can be installed at the back of the machine to enable, where necessary, spreading of an additional layer of non-mud substratum over the layer of heavily moistened culture substratum 4 in which the seed grains have been deposited.

Both the seeding unit comprising detent boxes 139 and seeders 146, and devices 145, 150 for sealing the films can be raised with the rear stamping roll 129 when the machine reaches the end of its travel.

FIG. 5 show an advantageous embodiment in which the spreading machine 100 is small in size and associated with a trailer 200 which can be automotive or drawn via the draw bar 211. The trailer 200 provided with wide wheels 201, 202 substantially comprises a chamber 203 for containing a reserve of main substratum 3. A belt comprising chains and small bars 204 is used to convey the substratum to a conveyor screw 205 taking the substratum to a chute opening above the hopper 148 of the machine 100, when the latter is to be fed. A fertilizer reservoir 206 and an additional reservoir 207, being able to be used as a seed or cutting seeder for other applications, such as forming the grass carpet, enable useful additives such as delayed action fertilizers for instance to be added to the substratum 3 contained in the chamber 203 at the level of the feed screw 205.

A control center 210 can be installed at the back of the trailer 200 beside a main reservoir 209 for the additional substratum.

In FIG. 5, only certain elements of the spreading machine 10 can be represented symbolically, however, said machine 100 can comply with the aforementioned description with reference to FIG. 4.

FIGS. 6 to 8 show a particular mechanical embodiment of a basic structure for the spreading machine 100. In FIGS. 6 to 8, certain elements have been omitted such as the nonwoven material film rolls 121, 124, the devices 140 to 145 for sealing the films 123, 126, the devices 131 to 139 for applying the additional substratum 4, the seeders 146 and the second stamping roll 129.

FIGS. 6 to 8 show in greater detail substantially the central part for spreading the main substratum 3. FIG. 6 shows notably using dotted lines a vertical sheet 160 fast with the wheel 114 and the spreading plate 113, on which the angles 107 bear when they move back towards the semi-flexible blade 111, to impart to the spreading plate 113 its reciprocating movement in a longitudinal direction.

I claim:

1. A process for the industrial production of plants by out-of-ground cultivation, comprising the steps of:
   (1)
   (a) laying down a first film of plastics material, wherein the first film is impermeable to plant roots;
   (b) laying down upon the first film a second film, wherein the second film has longitudinal edges and comprises a non-woven, fine-mesh film permeable to plant roots;
   (c) laying down upon said second film a layer of a main culture substratum, wherein the main culture substratum layer comprises graded particles, has a width less than the width of the second film and has a predetermined thickness,
   (d) laying down upon the main culture substratum a third film, wherein the third film has longitudinal edges, comprises a non-woven, fine-mesh film permeable to plant roots and has a width greater than that of the main culture substratum layer; and
   (e) fastening together the longitudinal edges of the second and third films by adhesion or welding, to form a sleeve enclosing the main culture substratum layer;
   (2) depositing on the sleeve seeding and an additional culture substratum, wherein the seeding comprises seeds or cuttings and wherein the additional culture substratum is heavily moistened and comprises a semi-liquid mud;
   (3) applying water to the sleeve to rear plants from the seeding, wherein the plants and the second film, third film and main culture substratum together form an assembly;
   (4) sectioning or rolling up the assembly after the plants have been reared; and
   (5) cutting, handling and packing the sectioned or rolled assembly.

2. The process according to claim 1, wherein the additional culture substratum is deposited in a continuous manner.

3. The process according to claim 1, wherein the seeds or cuttings are premixed with the additional culture substratum before spreading.

4. The process according to claim 1, wherein the seeds or cuttings are deposited on the sleeve before or after the additional culture substratum is spread.

5. The process according to claim 1, wherein the first film is a water permeable plastics film.

6. The process according to claim 5, wherein the water permeable plastics film is a microperforated film.

7. The process according to claim 1, wherein the third film is a plastics film having orifices or slots formed therein before the seeding is deposited.

8. The process according to claim 1, wherein the graded particles which comprise the main culture substratum are selected from one or more of the following ground bark, peat, vermiculite, humus earth, rock wool.

9. The process according to claim 1, wherein the additional culture substratum comprises a clod peat which has been finely ground and moistened before spreading.

10. The process according to claim 1, wherein the main culture substratum layer has an average thickness of approximately 15 mm to 50 mm.

11. The process according to claim 1, wherein the additional culture substratum layer has an average thickness of approximately 2 mm to 5 mm.

12. The process according to claim 1, wherein step (2) comprises depositing the additional culture substratum in multiple parallel strips set at a distance from one another on the sleeve.

13. The process according to claim 12, wherein the width of the main culture substratum layer is approximately 0.50 m to 1.00 m and wherein the width of each parallel strip of the additional culture substratum is approximately 6 cm to 10 cm.

14. The process according to claim 1, wherein during step 4 the first plastics film is left in place while the assembly comprising the second and third films enclosing the main culture substratum layer in which plant roots have penetrated is gathered up in sections or rolls.

15. The process according to claim 1, wherein said seeding when reared produces flowers and aromatic plants such as parsley, chervil and chives.

16. The process according to claim 1, wherein step (3) further comprises applying nutrient materials to the sleeve.

* * * * *